May 7, 1940.  O. W. TIMM  2,199,966
HYDRAULIC ACTUATOR FOR STEERING MECHANISMS, ETC
Filed March 27, 1939   3 Sheets-Sheet 1
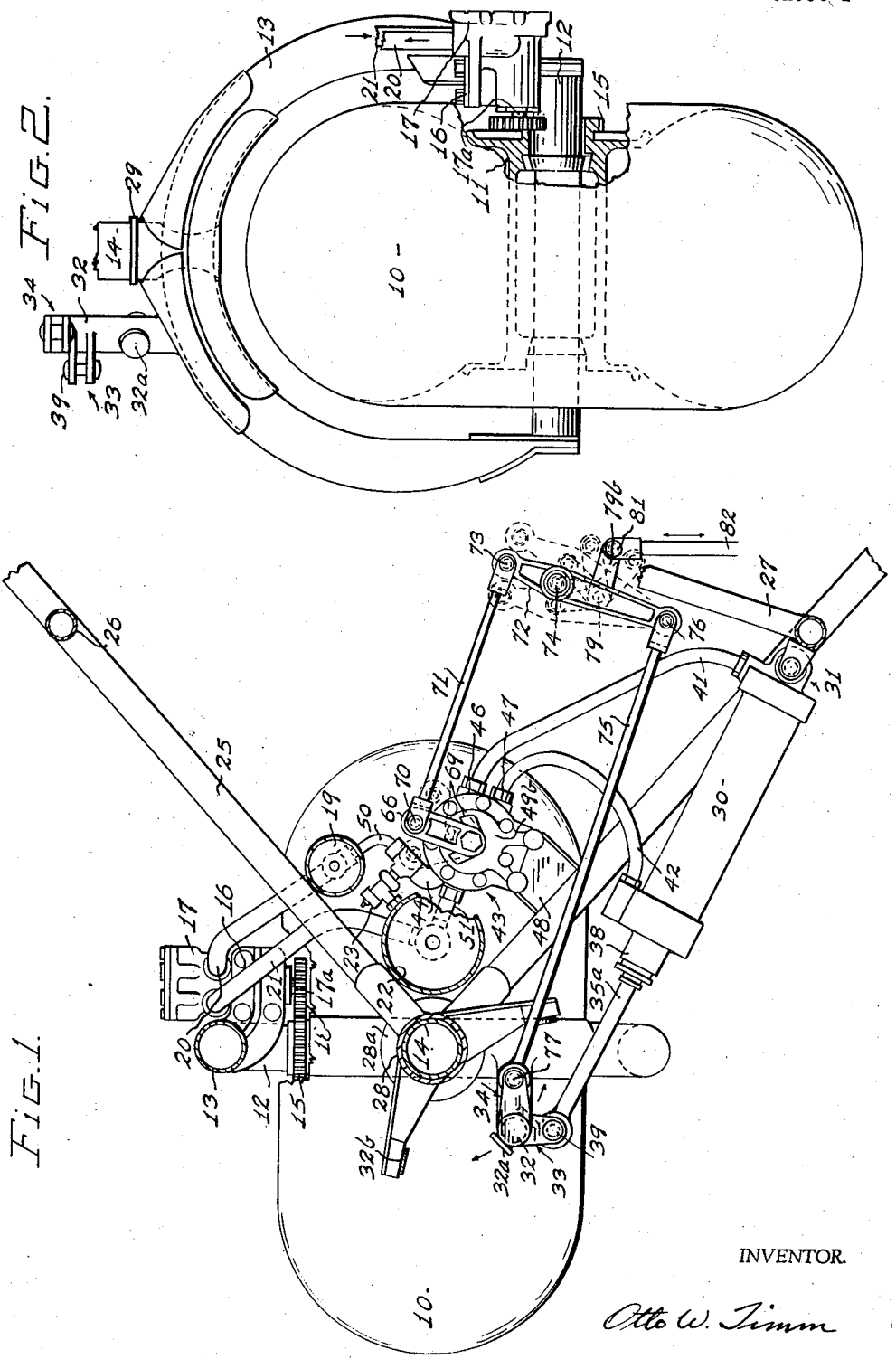
INVENTOR.
Otto W. Timm

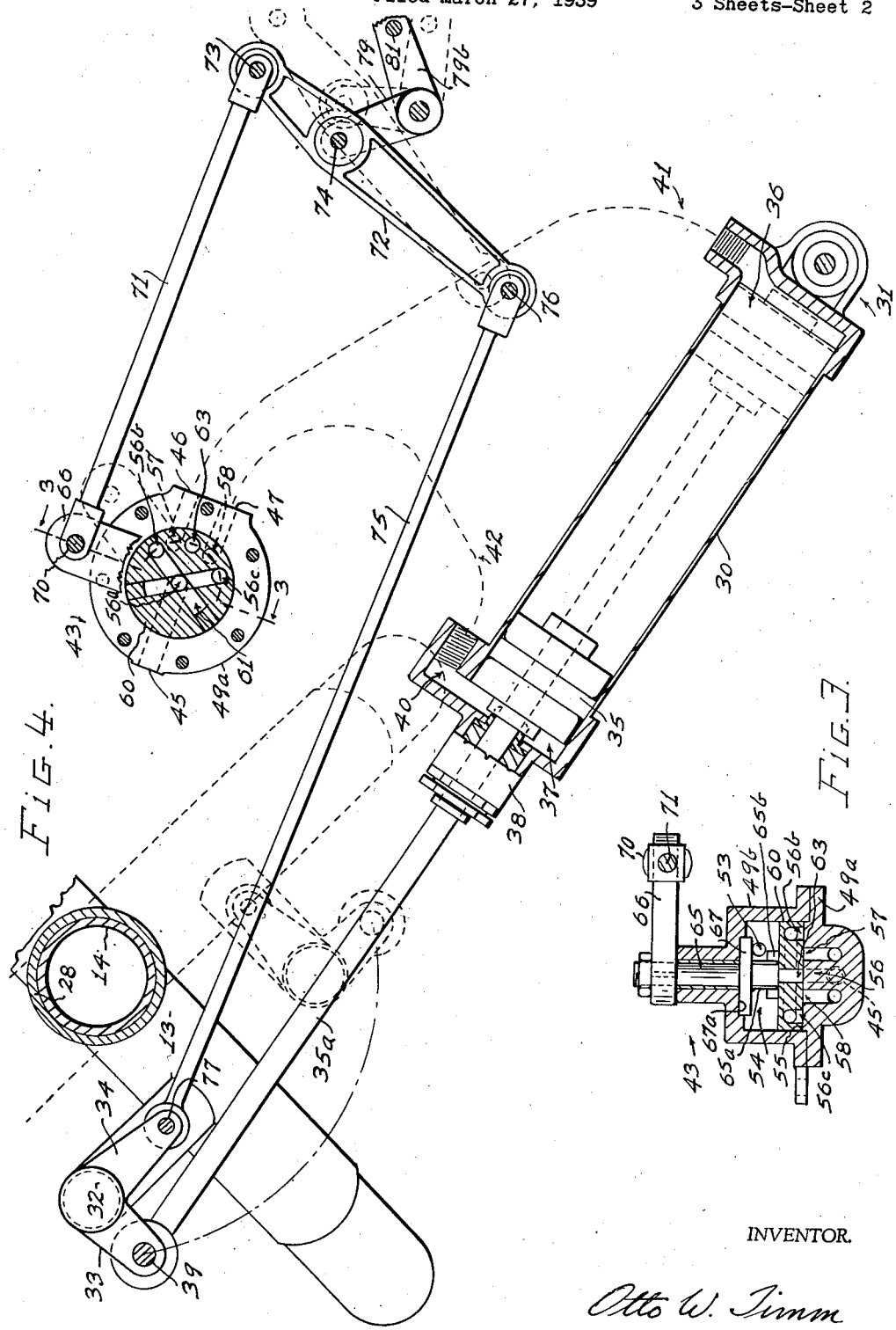

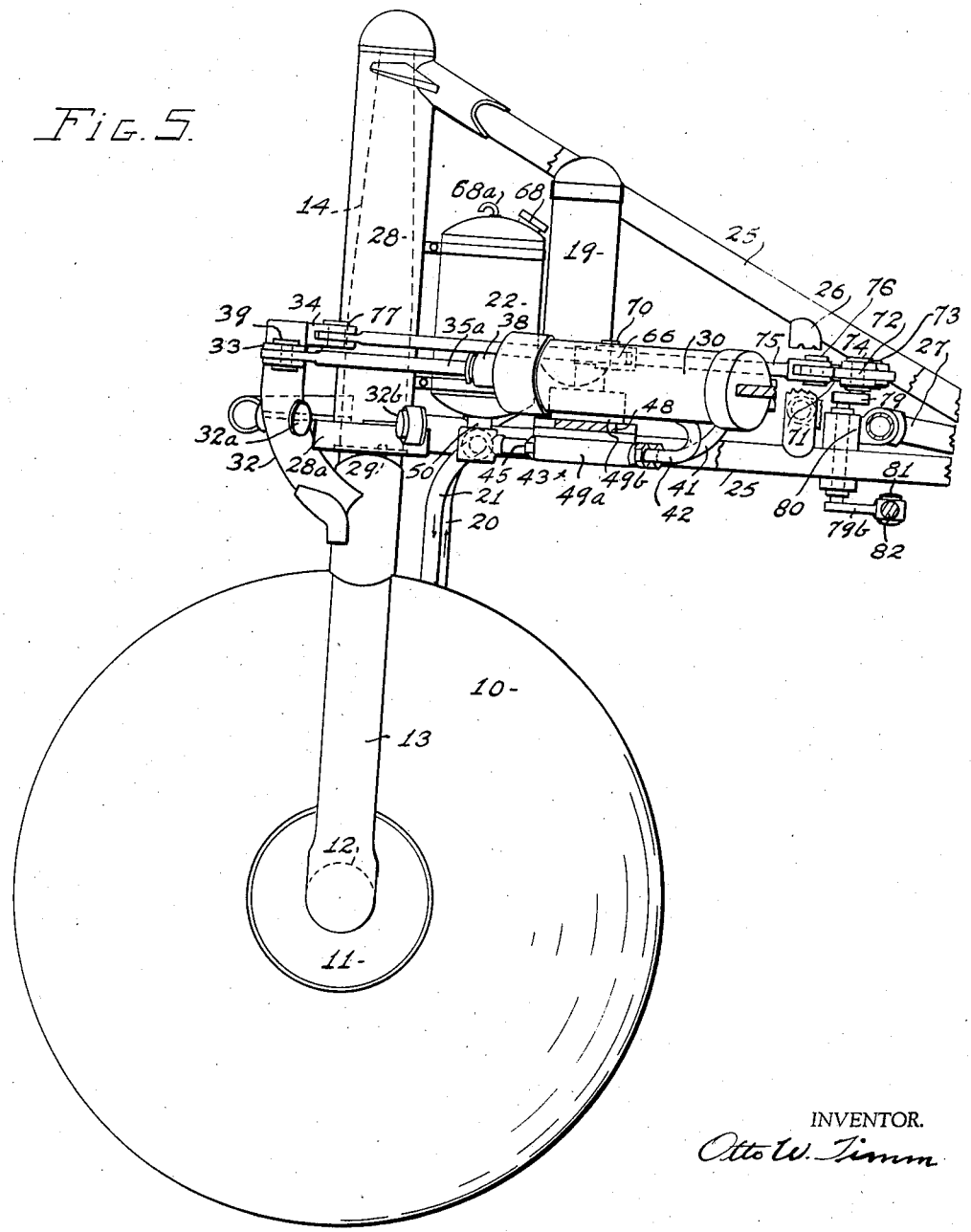

Patented May 7, 1940

2,199,966

UNITED STATES PATENT OFFICE 2,199,966

HYDRAULIC ACTUATOR FOR STEERING MECHANISMS, ETC.

Otto W. Timm, Glendale, Calif.

Application March 27, 1939, Serial No. 264,395

14 Claims. (Cl. 244—50)

My invention relates to hydraulically actuated devices with which an object is moved against resistance and, while the invention will apply to hoists, jacks, rams, controls, and the like, it relates more particularly to hydraulic steering mechanisms.

Control of the effective stroke of hydraulic actuators is a particular object of the invention, particularly where variable stroke is important. In the usual hydraulic actuator, both single and double acting, a valve is opened to admit hydraulic fluid to a cylinder to force the plunger in the corresponding direction, and, when the stroke has been completed the valve is closed. It is an object of this invention to provide that a manual valve control may be moved variable distances according to the stroke required, whereupon the plunger, having completed the stroke predetermined by the setting of the control, will react to close the valve.

In the steering mechanisms of heavy vehicles, airplane landing gear and the like, more power is required in a given time interval than can be comfortably or efficiently developed by an operator and it is to meet such conditions that I have provided a hydraulic actuator which provides that an operator may steer a wheel against considerable resistance as quickly and accurately as he may steer a small light weight vehicle, and with even less effort.

The invention takes into consideration two methods of control, each of which are peculiar to certain operating conditions. One method of control made possible by this invention consists of setting an indicator practically instantly whereupon the wheel or object required to be moved will be moved only the predetermined distance and at a rate best suited for the conditions then existing; the rate of movement being also under control. Under other conditions it may be preferable to, and the invention provides that the operator can, move the control in such manner that the wheel or object to be moved will follow with the control.

Another object of the invention is to provide that the actuating plunger may be definitely attached to the object under control and that the plunger will, at all times that it is stationary, be relatively hydraulically locked against movement. This is particularly important in steering mechanisms and in feeding devices where an object having been moved is required to be held in definite position.

In steering mechanisms metal-to-metal contact in the form of an irreversible clutch or worm gear is required to prevent the wheel or wheels from being turned by exterior forces such as when the running gear encounters rough terrain, and while the invention provides against the wheel being moved otherwise than predetermined by the operator it provides that metal-to-metal contact is not depended upon and that all parts are slightly yieldable, to prevent undue strain but without shimmer.

A suitable source of power is another object of this invention and in fact the invention provides that the very wheels which are controlled by the steering mechanism shall provide the power for steering same; the invention also providing that some of the power may be stored.

Another object of this invention is to provide a complete self-powered dirigible wheel unit to act as part of the landing gear of airplanes, particularly where only a single wheel is dirigible, and which unit includes the wheel, the hydraulic actuator, the control, and the means for pumping hydraulic fluid to the actuator; all included in a complete factory-adjusted assembly.

Other objects of the invention have to do with a dirigible wheel for airplanes where the pilot has, upon landing, many other factors to take into consideration. The invention provides, for example, that prior to contact of the wheel with the landing surface, the pilot may set an indicator and then dismiss further steering from mind, whereupon the dirigible wheel having contacted the landing surface will turn gradually into the predetermined direction.

I am aware that airplanes have been designed to be steered by the selective application of air pressure to each of two opposed landing wheels and that the compressor for supplying the air is driven by one or both of the landing wheels. This however is not true steering, arrests motion, is dangerous, and requires constant attention on the part of the operator whereas my invention provides for actually turning the dirigible wheel as in true steering and is applicable to all types of vehicles. A single dirigible wheel presents more design problems than does the usual pair of dirigible wheels found on an automobile, for instance, and since a single wheel is more easily diverted from its course by ruts or the like, the invention is best described by illustrating its application to a single wheel where it is particularly advantageous to have the wheel controlled against accidental or sudden movement not predetermined by the operator.

Other objects and advantages will appear hereinafter. A single wheel unit is shown in the accompanying drawings in which:

Figure 1 is a view mainly in plan of such a unit.

Figure 2 is a view of the wheel fork, looking forward.

Figure 3 is a vertical section of the control valve shown in Figure 1.

Figure 4 is a detail horizontal sectional view showing the valve controlled actuator in detail with all parts in the position of just having completed a full-stroke right-turn movement, as distinguished from Figure 1 which shows the parts in neutral or dead-ahead position.

Figure 5 is a side elevation of the parts shown in Figure 1.

The wheel to be steered is here shown as being of the type embodying a large area, low pressure tire 10 common to airplane landing gear, and a small diameter hub 11 rotating freely on the fixed axle 12. The axle 12 is held by corresponding spaced ends of a wheel steering fork 13; the fork having the usual integral vertically ranging shaft 14 which is inclined, as shown in Figure 3, at suitable "castering" angle. It will be understood however that this wheel is always under control and is not a free castering wheel, altho by employing the proper castering angle, steering strains and tire wear are reduced.

To the wheel hub is fixed a gear 15. The fork, at one branch and at a point near the gear 15 is provided with a supporting pad 16 to which is attached a conventional hydraulic pump 17, preferably of the rotary or gear type and embodying a shaft 17a carrying a pinion 18 which meshes constantly with gear 15. Thus the pump is operating whenever the tire 10 is rolling.

The hydraulic system includes the usual accumulator 19 which the pump supplies thru a pressure hose 20. Also the system includes the usual low pressure receiver 22 which supplies fluid to the pump by gravity or suction and which is connected to the pump by the suction hose 21. Hoses 20 and 21 are sufficiently long and flexible that they permit of the pump changing position as the wheel hub changes angularity in steering; and while the hoses may be shorter with the pump located on the branch of the fork opposite to that where it is shown; the pump is shown in the drawings in a position where it is not obscured by overlying parts.

A bye-pass valve 23 is provided between accumulator 19 and receiver 22, and while such pressure releases or bye-passes are well known in hydraulic apparatus to prevent excess pressure; this bye-pass so co-operates with other parts, as will appear hereinafter, as to have added functions.

The unit includes a triangular frame made up of forwardly converging struts such as 25, 25, and braces 26, 27, etc. The converging struts join at their forward ends with a vertically ranging sleeve 28 into which the fork shaft 14 is extended; the sleeve providing a bearing 28a cooperating with a thrust collar 29 on shaft 14.

This frame provides a particularly rigid support for the swiveled wheel fork, as well as serving to suitably support parts about to be described. Both the receiver and accumulator are fixed to this frame in any suitable location. A hydraulic cylinder 30 is provided which is supported by the frame; this being provided at its rear end with pivot means 31 thru which it imparts its thrust to the frame while being free to oscillate a few degrees in each direction on an approximately horizontal plane.

The general extent of the cylinder is approximately parallel to the corresponding of struts 25 so that its thrust is well taken by the frame, and, the cylinder is positioned as close to the wheel as possible. Instead of steering torque being applied thru the shaft 14, as might ordinarily be done, I provide the steering arm 32 which rises from the fork 13 in a position to encounter no interference from the closely associated parts. This stering arm has two horizontal extensions 33 and 34 at its upper end; the one being approximately right angular to the other. Also it has a pair of spaced buffers 32a, cooperating with corresponding buffers 32b carried by sleeve 28.

A double-acting plunger 35 is provided in the cylinder, acting to divide the interior of the cylinder into two chambers; one indicated at 36 being known herein as the right-turn chamber and the other indicated at 37 being known as the left turn chamber. The plunger includes the usual rigid plunger-rod 35a which passes out of the corresponding cylinder end thru a stuffing box assembly 38 and is connected with extension 33 of steering arm 32 by the pivot pin 39. It will be apparent now that the wheel may be turned in a right-turn direction by admitting high pressure fluid to chamber 36 while venting fluid from the left-turn chamber 37, and that the wheel may be positively turned from neutral position in which it is shown in Figure 1, or from any right-turn position, to left-turn positions by admitting high pressure fluid to chamber 37 while venting it from chamber 36. The chambers are each provided with a port 40 for admission and release of fluid; the ports each being provided with a corresponding flexible conduit; numeral 41 indicating the conduit for the right-turn chamber and numeral 42 indicating the conduit for the left-turn chamber. Each conduit serves of course as a high pressure supply means or a low pressure venting means as conditions require. These conduits need not be as long or flexible as the hoses heretofore described but since the cylinder does move slightly with respect to the frame, they must have corresponding flexibility.

The control valve is indicated at 43 and may be referred to as a "four-way" valve in that it has two "open" positions, in one of which it shall pass high pressure fluid from the accumulator to the right-turn chamber of the cylinder while venting fluid from the left-turn chamber to the receiver, and in the other "open" position it shall admit high pressure fluid from the accumulator to the left-turn chamber while venting fluid from the right-turn chamber to the receiver. It will be understood that the stroke of the plunger is sufficient to move the wheel from extreme right-turn position to extreme left-turn position and vice-versa. Altho an ordinary four-way valve will make the combination operative it is important that a well sealed valve be provided and having its ports arranged more in keeping with the objects of this invention and all moving parts adapted to take up wear and remain fluid-tight. Valve 43 is fixed to the frame as at 48 so that its body 49 is stationary.

The body is provided with four branches 44, 45, 46 and 47 respectively. Branch 44 is known as the high pressure inlet and is connected to receive high pressure fluid direct from the accumulator thru the short conduit 50. Branch 45 is known as the low pressure outlet or vent and is connected to the receiver by the short conduit 51. Receiver, accumulator and valve respectively, are all in close compact arrangement and the two former are either clamped or welded to the frame members. The branch 46 is known as the right-turn branch and connects with the right-turn conduit 41, while the branch 47 is known as the left-turn branch and connects with conduit 42. The valve body is made in two parts for proper assembly and accurate grinding and fitting of co-operating surfaces and includes the base 49a and the bonnet 49b. The high pressure inlet branch 44 is in the bonnet and is bored as at 53 to communicate directly with the interior chamber 54 of the bonnet. The base 49a presents a smooth upper surface 55 centrally of which is a low pressure outlet port 56 leading out thru the low pressure outlet branch 45. The two branches 46 and 47 are also in the base and each provides a corresponding passage terminating at the surface 55 each in a corresponding port 57 and 58 respectively. The port 57 is known as the right-turn port while the port 58 is known as the left-turn port. These ports are spaced apart a suitable distance on an arcuate line described around the center of the low pressure outlet port 56.

The valve includes a floating circular disc 60 which is held by fluid pressure against the surface 55 of the base 49a and which is rotatably guided by the bonnet 49b while turning about a center represented by port 56.

The disc is provided with a pair of ports 56b and 56c respectively which are complementary to outlet port 56 and these are in communication with a port 56a which is centrally of the valve disc and always in registration with port 56. Ports 56b and 56c are in constant communication with port 56a and therefor with port 56 by means of passageways 61 drilled or cored in the valve disc. Ports 56b and 56c respectively are spaced apart on an arcuate line described around port 56a as a center and their spacing is even greater than the spacing of ports 57 and 58 respectively. This provides that when the disc is in neutral position as shown in Figure 1 there is no communication between port 56 and either of ports 57 or 58, but by rotating the disc in one direction a few degrees either port 57 or 58, according to the direction of the rotation, will come into registration with a valve disc port leading to port 56. Ports 56a, 56b and 56c are all in the lower face of the valve disc and their sole purpose is to vent fluid from either port 57 or port 58 to port 56 so that such fluid may escape to the receiver. Therefor, there is no opportunity for both chambers of the cylinder to be vented to the receiver; which combined venting would allow the plunger and wheel to be freely moved by outside forces.

High pressure fluid from the accumulator by way of the bonnet is admitted to ports 57 and 58 selectively only by a high pressure port 63 which is provided in the valve disc and passes directly thru it. This port is so positioned that when the valve disc is in neutral position as shown in Figure 4 it is midway between ports 57 and 58 so that by turning the disc it may be brought into registration with either port 57 or port 58 but never with both simultaneously. However, as seen from Figure 4, ports 56b, 57, 63, 58, and 56c, respectively, are all spaced apart a distance less than the width of any port on a line described around the center of oscillation of the valve disc with the result that when one of the pair of ports 57 and 58 is brought into communication with port 63, the other of the pair is brought into corresponding communication with either port 56b or port 56c so that it communicates with port 56. Viewing the plunger and valve jointly as shown in Figure 4, it will be seen that to cause the plunger to move ahead (which as seen from Figure 1 will turn the wheel for a right hand turn) the valve disc is moved so that port 63 moves a slight distance in the direction which the plunger is required to move. This moves port 63 into registration with right-turn port 57 of the valve body and allows fluid to flow from the accumulator into the right-turn chamber 36 of the cylinder. Meanwhile port 56c of the valve disc moves to where it registers with no port while port 56b is brought into communication with port 58 of the valve body to allow fluid to be displaced from the left-turn chamber 37 of the cylinder into the receiver. Thus high pressure fluid flowing from the accumulator into the right-turn chamber 36 of the cylinder forces the piston outwardly, while venting of the left-turn chamber 37 allows the plunger to be moved accordingly without undue resistance on the part of the fluid being displaced to the receiver. The term "undue" as just used has significance in that the ports provided by the valve disc are calculated to pass fluid at the usual rate without appreciable power waste but tend to very materially resist any attempt by exterior forces to vent a chamber appreciably more rapidly than desired. In other words while accumulator pressure is forcing the plunger out against the resistance of wheel 10 or the like, the venting ports are sufficiently restricted that a sudden blow against the wheel would not allow it to move appreciably. Also as will appear later, the plunger, having traveled a predetermined distance, the venting will be cut off, but even under those conditions the throttling action of the ports is important.

The possibility of accurately machined ports, well fitted rubbing surfaces and self-sealing against high pressure are reasons for this particular design of the valve. The disc is turned by a stem 65 which passes out thru the bonnet to terminate in an exposed valve lever 66; the position of which lever is indicative of the position of port 63, and the direction in which the lever 66 is moved predetermines the direction in which the plunger will be urged by preponderance of fluid pressure. This stem 65 has a ground shoulder 67 internally of the valve bonnet and which is held by fluid pressure against a correspondingly finished surface 67a of the valve bonnet to keep a tight seal. The stem instead of being directly secured to the disc is provided at its inner end with flats 65a cooperating with lugs 65b formed on the valve disc so that while the disc and stem must move co-ordinately each is free to be seated against its corresponding working surface of the valve body by fluid pressure which is constantly maintained. The valve thus cooperates with the pump and the rest of the hydraulic system to provide a complete fluid circuit from which loss is always negligible. The receiver however is vented to atmosphere, as at 68a and can be replenished thru a filler spout 68. The valve stem and body respectively are provided with co-operating stops 69, 69 whereby the lever 66 can be moved only until port 63 of the disc is suitably registered with either port 57 or 58, and no further.

To the valve lever 66 is pivoted, as at 70, a rigid link 71 which extends rearwardly therefrom and approximately parallel to the cylinder, to one end of a compensator or equalization bar 72, to which it is connected by a pivot pin 73. This bar is approximately normal to the link and has an intermediate pivot 74 on which it oscillates. Its other end is connected to the extension 34 of the steering arm 32 by the link 75 and pivot pins 76 and 77 respectively.

Now it will be apparent that so long as the pivot 74 is fixed the valve lever 66 cannot be moved to open the valve without the plunger and the attached wheel moving accordingly, and since to move the wheel is presumably impossible by any effort which could be applied thru the links 71 and 75, the valve lever 66 can be moved only by changing the position of the pivot 74.

Any means for changing the location of the pivot point 74 with respect to the valve body constitutes the means by which the wheel is steered. In this embodiment the pivot is moved by a crank 79 having an arm 79b which is to be moved in the general direction in which it is desired to have the wheel turn. Crank 79 is oscillatable in a bushing 80 fixed to member 27 of the frame. Arm 79b is pivoted as at 81 to a rod 82, which rod may lead to any remote control device such as a steering wheel, rudder bar or the like (not shown).

With the wheel in dead-ahead position as shown in Figure 1 the rod 82 may be moved to move the pivot 74 to either of the broken line positions in which it is shown in Figure 1 thereby moving the valve lever to the corresponding of the two broken line positions in which it is shown in Figure 1. To move the wheel for a right hand turn with the parts in the position shown in Figure 1, the rod 82 is pushed to the right which moves the pivot 74 forwardly into broken line position, Figure 1. Since the plunger cannot be so easily moved, this movement of the pivot 74 results in the equalization bar pivoting about the pivot pin 76 of the link 75 so that the link 71 is advanced to move the valve lever against its stop to right-turn position. This moves port 63 into registration with right-turn port 57. Meanwhile, it is assumed, the wheel 10 is running over a landing surface and driving the pump which is charging the accumulator by fluid drawn from the receiver. This fluid passes, as previously described into right-turn chamber 36 and acts to advance the plunger while left-turn chamber 37 is being vented by reason of port 56c being in communication with port 58.

The outward thrust of the plunger acts thru the steering arm 32 to turn the fork and therefor the wheel 10. With the valve "wide-open" as it is in this case, the rate at which the wheel fork is turned relative to sleeve 25 and the frame, is maximum as determined by pump capacity. However, if due to friction or extremely low tire pressure, the wheel cannot be turned that fast, then the pump will deliver fluid faster than the plunger can move to receive it and a hydraulic pressure will be reached at which the bye-pass valve will open. Thus, by setting the bye-pass accordingly, the rate of turning with the valve wide-open can be predetermined. Again should the wheel momentarily encounter a rut or surface obstacle which will tend to move it reversely the wheel will "give" by reason of the plunger reacting thru the hydraulic fluid against the cushion of the accumulator, and if this reaction is excessive the bye-pass can open to relieve the back pressure before damage is done to the wheel or connected parts.

When the plunger has moved the wheel to the right until one of the buffers 32a on the steering arm is about to abut a buffer 32b on the sleeve, the valve will have been closed. This is due to the fact that with the pivot 74 held in broken line position (Figure 1) advance of the plunger acts thru link 75, bar 72 and link 71 to move the valve lever and disc back to neutral position. This closes off all intercommunication between ports, and both cylinder chambers are filled with totally separated and isolated bodies of incompressible fluid. While this condition may never exist for but a slight instant in steering mechanisms, this condition is herein pointed out to show its application to other machines to which the invention may be applied; as for instance where an object is to be moved and held.

Figure 4 shows the right turn as fully completed; the plunger having moved to the forward end of the cylinder; the links having reacted to move the valve lever to closed or neutral position, and the equalization bar having taken the characteristic position shown. The position of this bar in Figure 4 is the same as if the act of advancing the pivot 74 to broken line position, Figure 1, had acted directly to move the steering arm and plunger instead of moving the valve, and the position of pivot 74 is indicative now (Figure 4) of the position of the wheel. Thus for any position of pivot 74 there is a corresponding position on the part of the dirigible wheel with the valve in closed position, and once the pivot has been set to any such position the hydraulic mechanism will perform until such position has been reached by the dirigible wheel and the valve has closed to hold it there.

For example, with the parts in full line position, Figure 4, it is desired to return the fork and wheel not only to neutral position but over to extreme left-turn position. Accordingly rod 82 is reversed as far as it will go. Since the wheel fork is now stationary such movement of the pivot 74 will move the equalization bar and the pivot 74 into broken line position, Figure 4. This will bring the valve lever up against the corresponding stop with port 63 registered with left-turn port 58. In Figure 4 the broken line position of pivot 74 is neutral, or the same as before any operations began and as shown in full lines in Figure 1. Now the plunger will be moved rearwardly by reason of fluid entering left-turn chamber 37 and being vented from the right-turn chamber 36. As the plunger moves back it moves the connected end of the equalization bar rearwardly and thereby advances the other end and the link 71 forwardly to move the valve disc toward closed position. Finally the plunger returns to central position; the valve is then in the closed or neutral position shown in full lines in Figure 1, the equalization bar is in the position shown in full lines in Figure 1, and the dirigible wheel has undergone a partial "left-turn" from extreme right position to dead-ahead position, and is now in original dead-ahead position.

To continue the wheel 10 to the left for a left turn the rod 82 is turned to bring the pivot point 74 to the rear of that shown in Figure 1 or actually into the corresponding broken line position, Figure 1, which again brings the valve lever back against the corresponding stop and again brings port 63 in registration with port 58, and the plunger is then pumped to the rear while the pivot point remains stationary, causing the link 75

75 to move back and operate thru the equalization bar to move the link 71 forward to move the valve disc again to neutral position. Now the parts are in extreme left-turn position with the valve closed. To cause the dirigible wheel to be now moved back to neutral, the rod 82 is turned to the right.

It will be seen now that in addition to neutral position of all parts as shown in full lines in Figure 1, there are six other characteristic positions of the parts: (1) Wheel in dead-ahead position with valve open to effect a right-turn, shown in one broken line position Figure 1. (2) Wheel in dead-ahead position with valve open to effect a left-turn, shown in corresponding broken line position Figure 1. (3) Wheel in angular position having completed a right-turn with valve closed to hold wheel locked in such position, shown in full lines Figure 4. (4) Wheel in right-turn position with valve open to cause wheel to be moved back toward, or to, neutral position, shown in Figure 4 by the broken line position of the valve lever and equalization bar respectively and the full line position of the wheel fork. (5) Wheel fork in full left-turn position (indicated by broken line position of wheel fork and plunger respectively in Figure 4), with valve closed, and (6) same position of wheel fork and plunger with valve open for movement of wheel fork toward the right to bring the wheel back to neutral.

While in vehicle steering such immediate predetermining of the position to be quickly reached by the dirigible wheel, may not be the best practice, it has first been described herein to show the great flexibility of the apparatus, and to point out how the device is suitable for all manner of operations such as hoisting and the like.

For ordinary vehicle steering, or for other hydraulic movements, where more constant and delicate manipulation is required, or for conditions where the plunger is to be moved from one extreme to the other but at controlled speed and even at speeds which vary during the operation, the apparatus is also admirably suited. For example: with the parts in the position shown in Figure 1 the pivot 74 is moved in the required direction only a very slight distance. Owing to the circular section of the ports, and the fact that complete opening of the valve represents a movement of the disc only slightly greater than the diameter of a port, the disc may be moved to provide only a slight opening. Since the bye-pass predetermines maximum pressure, and since this is constant pressure, at least during slow steering; the area of a port opening will, by hydraulic laws, be directly proportional to the speed at which fluid can enter. Thus for controlled steering the act of moving the pivot only slightly to open the valve only slightly will mean that the speed of the plunger will be reduced accordingly. As soon as the valve is opened, movement of the piston begins and therefor the valve begins to close. By moving controls in the proper direction at just the desired speed the plunger will move only accordingly; the dirigible wheel will be under the same control as that of a light vehicle being directly steered, and with the very minimum of movement of the rod 82 the movement can be immediately reversed. During slow steering however the throttling action of the ports still has its effect and practically speaking the wheel is locked against being moved unduly by exterior forces.

This method of "following thru" with the manual control does not imply any limit to the speed with which the dirigible wheel may be turned. Thus the pump and ports may be large enough to give extremely rapid controlled movement, such as might be required where this novel mechanism is used for moving heavy objects, or where the plunger operates a reciprocating machine of variable stroke. By predetermining port sizes, and by adjusting the bye-pass valve, any condition as to speed and degree of control may be attained and the invention is applicable to all manner of airplane controls where the mere movement of an indicator or wheel to a predetermined position means that hydraulic pressure will overcome all resistance and move the controlled member to desired position and hold it there without further thought on the part of the operator.

I propose in airplanes to pivot the frame at the rear end to a fuselage so that wheel 10 provides a dirigible nose wheel in combination with a pair of directionally stable landing wheels to the rear of the center of gravity, to provide a level attitude on the ground, and level landing and takeoff. Further the frame in such case may be pivotally snubbed by a shock absorber so that the simple, compact frame and light-weight steering mechanism are a single unit. In airplane practice the pivot 74 may be connected to the rudder controls so that same will be effective only on the rudder when the airplane is in flight but will be operative upon both rudder and dirigible landing wheel when the landing wheel contacts the ground. Also by providing a suitably resilient connection between rudder control and landing gear the rudder may be moved from one extreme position to others while the valve stem is held against a corresponding stop until the wheel shall have been turned to the corresponding other extreme position. Also the frame, pivotally mounted on an airplane fuselage, may be equipped with retracting mechanism whereby the unit described herein may be retracted when in flight. Another modification for airplanes consists in providing a spring actuated centering mechanism which will slowly move all parts to neutral position while in flight so that the dirigible wheel will invariably land while pointed dead ahead, there being sufficient bye-pass provision to allow the wheel to be thus centered as well as allowing slight movement of the dirigible wheel by the act of landing other than directly in the direction which the wheel is then pointed.

I claim:

1. In a steering mechanism a single dirigible wheel, a hydraulic cylinder, a plunger in said cylinder dividing the interior thereof into a right-turn chamber and a left-turn chamber respectively, a plunger rod to said plunger connected to move said wheel for steering, a source of high pressure incompressible fluid, a valve between said source and said cylinder having a member normally in neutral position acting to retain fluid in each of said chambers to substantially lock said plunger against movement; said member movable from neutral position in one direction to establish communication between said right-turn chamber and said fluid source while venting said left-turn chamber; said member movable from neutral position in the other direction to establish communication between said fluid source and said left-turn chamber while venting said right-turn chamber, a pivot, a bar pivoted intermediate its ends on said pivot, a link connecting one end of said bar with said valve member, a link at the other end of said bar connecting same with said plunger rod, a manual steering control comprising means for moving said pivot, a triangular frame, a vertical sleeve at the apex of the triangular frame, a wheel fork supporting said wheel, a vertical shaft to said fork extending into said sleeve, and a steering arm projecting from said fork; said plunger rod pivotally connected to said steering arm.

2. The steering mechanism as in claim 1 and further including a pump driven by rotation of said wheel and serving as said fluid source.

3. The steering mechanism as in claim 1 and further including a pump driven by rotation of said wheel serving as said fluid source, and an accumulator between said pump and said valve.

4. The steering mechanism as in claim 1 and further including a high pressure relief valve between said fluid source and said valve.

5. The steering mechanism as in claim 1 and further including a pump driven by rotation of said wheel serving as said high pressure fluid source, and a relief valve between said pump and said valve.

6. The steering mechanism as in claim 1 in which said high pressure fluid source comprises respectively, a pump driven by rotation of said wheel, an accumulator to receive fluid from said pump and to deliver same to said valve, and a receiver connected to receive fluid vented by said valve member from said chambers and to deliver such fluid to said pump.

7. The steering mechanism as in claim 1 in which said high pressure fluid source comprises respectively, a pump driven by rotation of said wheel, an accumulator to receive fluid from said pump and to deliver same to said valve, and a receiver connected to receive fluid vented by said valve member from said chambers and to deliver such fluid to said pump; the mechanism further including a relief valve between said accumulator and said receiver set to predetermine the maximum rate of movement of said plunger.

8. The steering mechanism as in claim 1 and further including means for maintaining a substantially constant fluid pressure at said valve to predetermine rate of travel of said plunger.

9. The mechanism as in claim 1 and in which said valve member is movable by, and capable of being held in any predetermined intermediate position by, said steering control to predetermine the rate at which fluid is admitted to and vented from said chambers; said pivot being at all times movable relative to the plunger.

10. In a nose-wheel unit for airplanes, a wheel fork, a shaft rising from said fork, a steering arm rising from said fork offset from said shaft, a sleeve encompassing said shaft, a triangular frame of which the sleeve forms the forward apex, a hydraulic cylinder approximately paralleling one side of said frame and pivoted thereto at its rear end, a plunger in said cylinder dividing the interior thereof into a right-turn chamber and a left-turn chamber respectively, a plunger rod extending from said plunger thru the forward end of the cylinder, a pivot pin connecting said plunger rod with said steering arm, a valve supported by said frame adjacent said cylinder and providing a high pressure inlet branch, a low pressure outlet branch, a right-turn branch and a left-turn branch, respectively, a flexible conduit leading from said right-turn branch to said right-turn chamber, a second flexible conduit leading from said left-turn branch to said left-turn chamber, an accumulator carried by said frame, connected with said source of high pressure fluid and also connected to deliver fluid to the high pressure inlet branch of said valve, a receiver connected to receive spent fluid from said low pressure outlet branch of said valve, a ported disc to said valve normally in neutral position in which it separates the left-turn and right-turn branches respectively from each other and from the other branches; said disc movable in one direction to provide communication between said high pressure inlet branch and said right-turn branch while connecting said left-turn branch with said low pressure outlet branch; said valve disc movable in the other direction from neutral to provide communication between said left-turn branch and said high pressure inlet branch while providing communication between said right-turn branch and said low pressure outlet, and steering means comprising means for moving said valve from neutral in either direction and vice-versa, and a pump connected to receive fluid from said receiver and to deliver fluid to said accumulator.

11. The unit as in claim 10 and in which said pump is connected to be driven by rotation of said wheel.

12. The unit as in claim 10 and further including a relief valve between said accumulator and said receiver adjusted to predetermine the rate of travel of said plunger.

13. The unit as in claim 10 in which said steering means comprises, a valve lever to said disc approximately normal to said plunger rod when in neutral position, a link pivoted at one end to said valve lever and extending rearwardly, a second link pivoted at its forward end to said steering arm and extending rearwardly approximately parallel to the first named link, an equalization bar pivotally connected at one end to the corresponding end of the first named link and pivotally connected at its opposite end to the corresponding end of said second link, a pivot to said bar intermediate its ends, and manual means for moving said pivot toward and away from said valve in the general direction of travel of said links.

14. The unit as in claim 10 and further including a support on said fork adjacent the wheel and supporting said pump, a gear to said wheel, a gear to said pump meshing with the first named gear, and hoses connecting said pump with said receiver and accumulator respectively.

OTTO W. TIMM.